E. L. MILLIGAN & F. D. COOLEY.
VALVE ROTOR FOR PUMPS.
APPLICATION FILED JUNE 29, 1908.

952,830.

Patented Mar. 22, 1910.
2 SHEETS—SHEET 1.

Witnesses
Clarence E. Doy
A. P. Monnier

Inventors
Edward L. Milligan
Frederick D. Cooley
By Parker & Burton Attorneys

UNITED STATES PATENT OFFICE.

EDWARD L. MILLIGAN AND FREDERICK D. COOLEY, OF DETROIT, MICHIGAN.

VALVE-ROTOR FOR PUMPS.

952,830.

Specification of Letters Patent.  Patented Mar. 22, 1910.

Application filed June 29, 1908.  Serial No. 440,779.

*To all whom it may concern:*

Be it known that we, EDWARD L. MILLIGAN and FREDERICK D. COOLEY, citizens of the United States, residing at Detroit, county of Wayne, State of Michigan, have invented a certain new and useful Improvement in Valve-Rotors for Pumps, and declare the following to be a full, clear, and exact description of the same, such as will enable others skilled in the art to which it pertains to make and use the same, reference being had to the accompanying drawings, which form a part of this specification.

This invention relates to valve rotors for pumps, and has for its purpose an improved device whereby, at each actuation of the valve, the hard rubber or other gasket immediately adjacent to its metal hub portion is turned slightly on its seat with respect to this metal portion, so that the wear arising from contact therewith does not always occur at the same point, and result eventually in inequality in the wear upon the surface of the hard rubber gasket and consequent damage to the valve.

Figure 1:
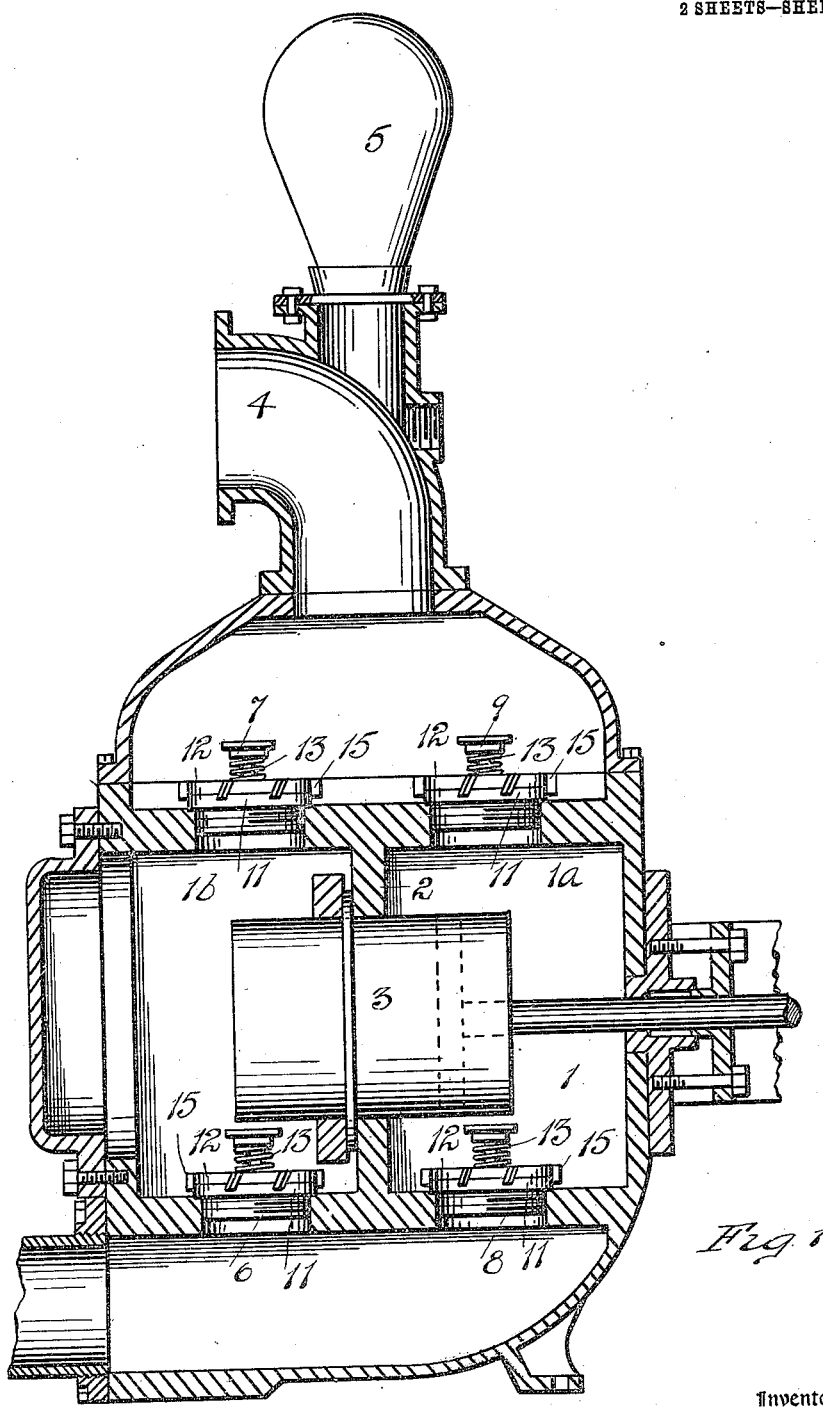
Figure 2:
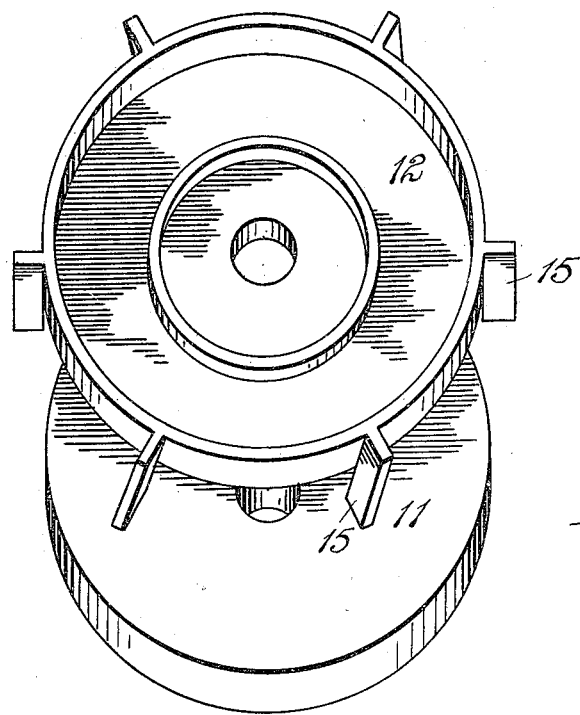
Figure 3:
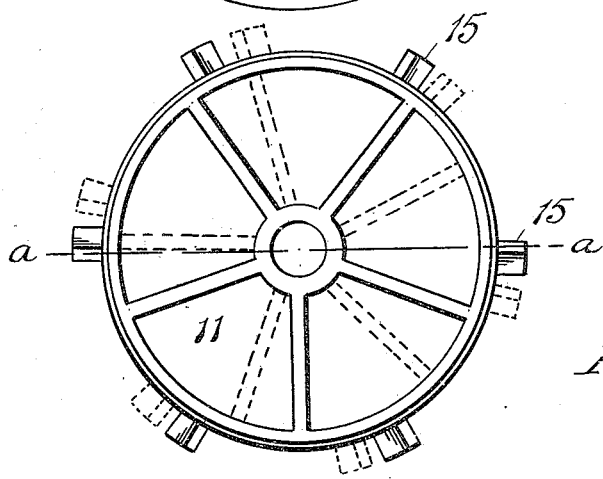
Figure 4:
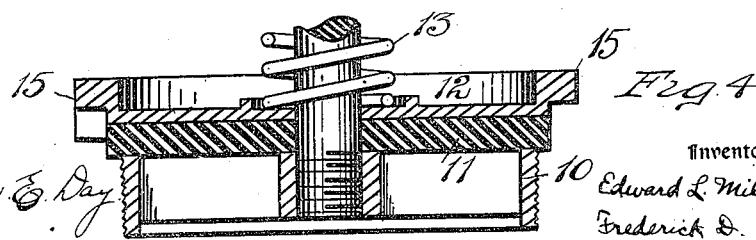

In the drawings:—Figure 1, is a sectional elevation of the pump, whose valves, two inlet and two outlet, are equipped with our improved gasket rotor. Fig. 2, is an enlarged perspective of the rotating cap, and the washer. Fig. 3, is a plan view of the gasket and the valve spider, showing the variety of positions as to wear which the gasket can assume with respect to the valve piece. Fig. 4, is a vertical section along the line *a—a* of Fig. 3, showing the vertical relation of the parts here described.

1 represents a pump cylinder, which is divided into two compartments 1ª and 1ᵇ by the wall 2, which peripherally occupies the space about the piston 3, so that each movement of the piston in either direction is for one of the chambers an inlet phase, and for the other an outlet phase, thereby insuring a practically continuous stream of water through the delivery pipe 4, any irregularity in the flow being compensated for in the well known manner by the air chamber 5.

6 and 8 indicate the inlet valves, and 7 and 9 indicate the outlet valves of a pump, whose valves embody this invention. The valves are all alike, and a description of one will be sufficient for a full understanding of the invention. The valve seat is circular, and terminates an inserted bushing or short pipe 10 inserted in a passage through a hole in the wall of the piston chamber. Concentric with the pipe 10 is a smaller internally threaded pipe or hub which supports a valve guide 16. The hub is supported by a spider arm 17. A gasket 11 adapted to engage over the short pipe 10 as a valve, is provided with a central perforation, and engages around the guide 16. A rotor plate 12 engages over the gasket 16. The rotor plate is a disk-like plate preferably with an annular cavity on its upper side, and this disk rotor is provided with wings or vanes that extend radially beyond the periphery of the disk proper, and each wing or vane extends laterally beyond the plane of the flat or smooth side of the disk, the lateral projections being arranged and adapted to engage closely around the periphery of the gasket 11, with contact sufficiently intimate to cause the rotation of the disk plate 12 to communicate its rotary movement to the gasket 11. The extending wings or vanes 15 are inclined to the axis of rotation of the disk, and these inclined wings furnish a resistance to the water flowing through the valve, which is greater on the under side, or that side which is most directly opposed to the flow of the water, than is the resistance on the opposite side, and the flowing water produces a rotary action of the disk. The disk thus becomes a motor or rotor, which not only revolves on its own center, but carries with it in revolution, the packing gasket in intimate connection with it. The rotation of the gasket produces a consequent shifting of the bearing of the gasket on the valve seat, and on the spider arms 17, and causes the descriptive action, due to their contact, to be evenly distributed around the entire surface of the gasket.

The gasket can be very readily removed, and a new gasket placed in position when it has become so worn that it is no longer effective as a close fitting valve. The rotor itself lasts indefinitely.

What we claim is:—

1. In a valve, in combination with a seat, a spider member having straight arms fixed thereacross, a packing gasket engaging wholly thereover perpendicularly to the axis of the seat, a rotor disk of substantially the same diameter as the gasket, resting on its upper face, obliquely inclined vanes arranged peripherally upon the disk, being outside the body portion thereof, and lying at a greater radial distance from the common axis than the seat, said vanes being adapted to extend over and engage against the peripheral edge of the gasket, and a spring pressing the upper surface of the disk and thereby forcing the gasket against its seat and the adjacent face of the spider, against whose resiliency said parts rise from their normal position of closure when subjected to the pressure of escaping water, substantially as described.

2. In a valve, in combination with a pipe terminal constituting a fixed seat, a spider member fixed thereacross, a gasket member adapted to seat thereover, a rotor disk lying on the top of the gasket member, a spring for yieldingly holding said gasket against the seat by pressure upon the top face of the disk, and inclined vanes arranged about the periphery of the disk and engaging with their lower portions against the periphery of the gasket, adapted to receive the actuating impact of water after it has escaped past said seat and gasket, and to transmit rotative actuation to said disk and thereby to said gasket, substantially as described.

3. In a valve, the combination of a valve seat, a fixed included spider having uninclined arms, a packing gasket, a disk member engaging with its lower surface the upper surface of the gasket, inclined vanes fixed about the periphery of the disk, and engaging with their depending lower portions the peripheral edge of said gasket, adapted to receive the impact of water after it has escaped past the valve seat and to thereby transmit rotative actuation to the disk and gasket, and resilient means for keeping the parts in assembled and operative relation, substantially as described.

4. In a valve, in combination with a casing, a spider member fixed therein, the arms of said spider member having faces which extend parallel with the axis of the spider member and of the casing, a gasket disk engaging thereover and serving when seated as a complete closure thereto, a rotor disk engaging over said gasket disk, resilient means for holding said disks adjacent to one another and said gasket disk against said spider, and obliquely inclined vanes arranged about the peripheral outer edge of the rotor disk and frictionally engaging with their terminal portions against the peripheral edge of the gasket disk, adapted to receive the impact of water escaping from said valve past the peripheral edges of said disks and to thereby bring about the rotative actuation of the same, substantially as described.

In testimony whereof, we sign this specification in the presence of two witnesses.

EDWARD L. MILLIGAN.
FREDERICK D. COOLEY.

Witnesses:
CLARENCE E. DAY,
WILLIAM M. SWAN.